Aug. 28, 1945.     D. E. LEWIS     2,383,727
UNIT-TYPE ANTIFRICTION BEARING AND METHOD OF MAKING THE SAME
Filed July 11, 1942
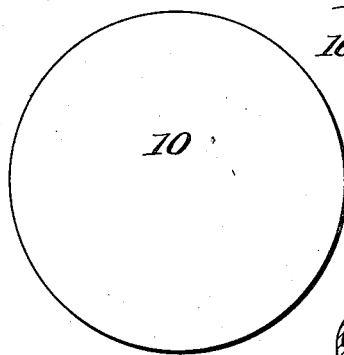
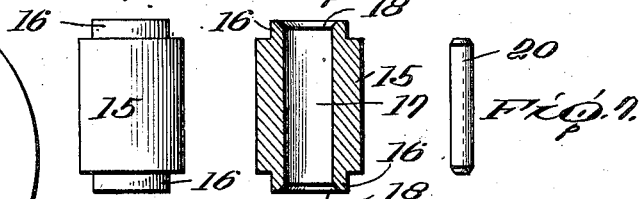
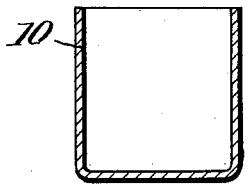
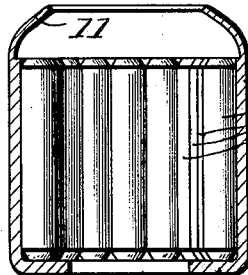
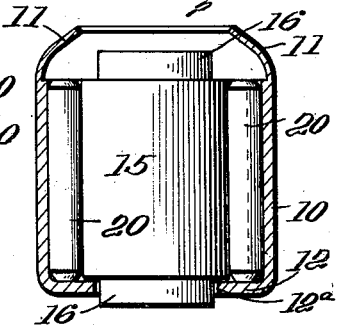
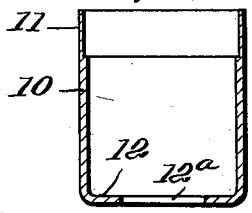
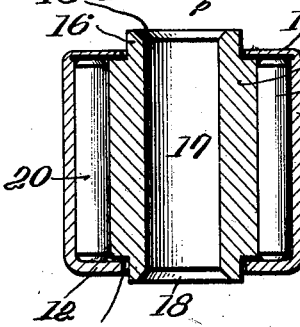
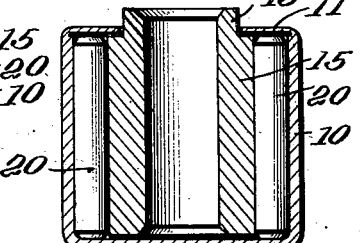
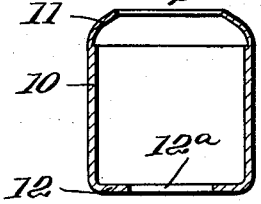
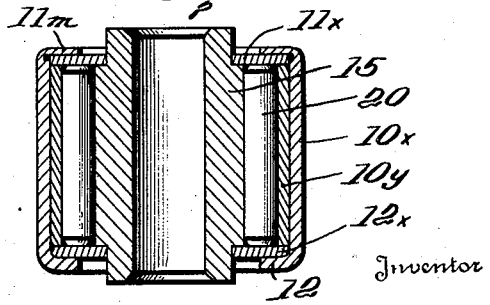
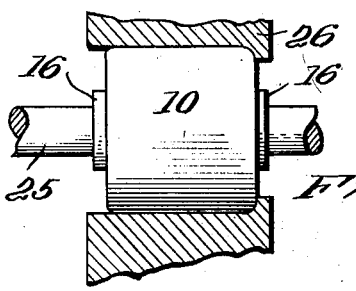
Inventor
Donald E. Lewis,
By Mason, Porter & Diller,
Attorneys Patented Aug. 28, 1945

2,383,727

UNITED STATES PATENT OFFICE 2,383,727

UNIT-TYPE ANTIFRICTION BEARING AND METHOD OF MAKING THE SAME

Donald Edward Lewis, Torrington, Conn., assignor to The Torrington Company, Torrington, Conn., a corporation of Maine Application July 11, 1942, Serial No. 450,594

2 Claims. (Cl. 308—213)

This invention relates to an antifriction bearing of unit-type, comprising inner and outer races and antifriction members, which are assembled against separation from one another and can be handled and used as a unit.

One of the features of the present invention is the provision of inner and outer race members which may be formed in quantity by operations on automatic machinery, and then assembled by further mechanical forming operations upon the parts for holding them in final assembled position.

Another feature of the invention is the provision of such a bearing by forming a cup from sheet metal, introducing an inner race and antifriction members into the cup, and then bending the lip of the cup into position for retaining the inner race and members in position.

A further feature of the invention is the provision of an outer race including a cup having a thinned lip, together with an inner race which may be simply and easily formed in quantity, together with an assembly of parts by introducing the inner race and antifriction members into the cup, and then bending the thinned lip inwardly so that it forms a retaining flange effective in conjunction with a flange at the bottom of the original cup for holding the parts in assembled condition.

Still another feature of the invention is the provision of an outer race including a one-piece cup formed by successive drawing operations to have a cylindrical portion with a first inturned flange at the bottom of the cup and having a thinned lip at the other end of the cup, this lip being bent inwardly to form a truncated cone, together with an inner race which is positioned within the cup by passing it through the orifice at the smaller end of the truncated cone, with antifriction rollers positioned between the races, the conical lip wall then being bent inwardly and axially to a position where it cooperates with the said flange for retaining the inner race and antifriction members against separation.

A still further feature of the invention is the provision of an antifriction bearing including an outer race having a cup with a flange at one end, which receives an inner race and antifriction members and is provided at its other end with a washer which rests against a shoulder of the outer race and is held thereto by an integral inwardly-turned portion at the lip of the cup.

With these and other features as objects in view, as will appear in the course of the following specification and claims, illustrative forms of practicing the invention are set out in the accompanying drawing in which, Figure 1 is a view showing an original blank for drawing a cup.

Figs. 2, 3 and 4 are successive views indicating stages of the drawing of this cup.

Fig. 5 is a side elevation of an inner race.

Fig. 6 is an axial section of the same.

Fig. 7 is a side elevation of an antifriction roller.

Figs. 8, 9 and 10 show successive stages in the assembly of an antifriction bearing according to this invention.

Fig. 11 shows an antifriction bearing of Fig. 10 employed for supporting a shaft within a machine frame member.

Figs. 12 and 13 are axial sectional views of modified forms of construction.

In the method illustrated in Figs. 1 to 4, a round blank of metal 10 is formed by appropriate means such as single-action punch-and-die sets, or multiple-action punch-and-die sets, firstly into the form of a cup (Fig. 2), which is then further operated on to provide a thinned lip portion 11 at the open end, and to have an aperture 12a in the bottom flange 12 provided by the central portion of the original blank, so that the metal now has the form of the cup 10 illustrated in Fig. 3. A further punch-and-die shaping portion is then performed for bending the lip 11 inward at an acute angle (Fig. 4) so that it assumes the form of a hollow truncated cone, with the aperture at the smaller end of the cone remaining somewhat larger than the size of the inner race which is to be introduced.

It is preferred to provide the thin lip 11, as this avoids distortion of the main wall of the illustrated cylindrical portion of the cup 10, during the operation of bending to the form shown in Fig. 4. It is also preferred to accomplish this primary bending of the lip 11 before heat-treatment, as at this time the metal can be more easily moved into position while still in relatively soft condition, and therewith the operation of decreasing the effective diameter of the lip can be attained by a forming punch without causing crimping or irregularities.

The cup can now be subjected to heat treatment such as a case hardening operation so that its surfaces are rendered hard and resistant to wear; and is then given a high polish.

The inner race illustrated in Figs. 5 and 6 can be formed by automatic screw machine operations in quantity and with rapidity. As illustrated, the main body 15 has a cylindrical section and has an axial dimension slightly less than the intended distance between the securing means in the final assembly. End projections 16 have a lesser cross section, and this inner race may be provided with an axial bore 17 which may be slightly chamfered at the ends 18 to permit easy assembly upon a shaft or spindle. The structure thus made can be hardened or case hardened, and finished by surface grinding in a centerless grinder.

The antifriction rollers 20, as illustrated in Fig. 7, may be formed from wire of a proper specification of metal by straightening, cutting and forming to length, hardening and then grinding on centerless grinders In assembling the parts as shown in Figs. 8, 9 and 10, the preferred procedure is to introduce a proper number of the small-diameter rollers 20 within the formed cup 10, holding them in position by a light coating of petrolatum. The rollers then adhere within the cup (Fig. 8). The inner race is then introduced through the aperture of the lip 11, and its body 15 enters within the nest of rollers 20 so that these rollers now provide the roll spacing elements between the two races. The lower projection 16 of the inner race is received in the aperture 12 in the bottom flange of the cup 10. The parts are then as shown in Fig. 9.

The structure thus far assembled is now subjected to a further bending operation, which is performed upon the lip 11. It is preferred to perform this bending while holding the outer surface of the cup 10 within a surrounding die, and to engage a punch with the lip 11 which thus has its generatrices bent inwardly and axially until the aperture at the inner edge of the lip 11 is brought close to the end of the main body 15 of the inner race, while leaving a space for permitted freedom of rotation of this inner race. The lip 11 thus overlaps both the antifriction rollers 20 and the inner race, and operates in conjunction with the lower flange 12 to prevent relative separating movements of the inner and outer races and the rollers.

The assembly thus provides a unit which can be shipped and handled as such. In the illustrated form, it is capable of receiving a spindle 25 which may be of ordinary cold rolled stock, so that when the cup 10 is forced into an aperture of a machine frame 26, it provides for a highly accurate bearing between the members 25, 26, without demanding extreme care in observing close tolerances in either of these members.

In the modified form shown in Fig. 12, the lower flange 12 has not been provided with an aperture 12a, and only one reduced projection 16 is provided on the main body 15 of the inner race. The parts can be made and assembled essentially in the manner described for Figs. 1 to 10. This type of bearing is suitable for service where a shaft is to be supported for free rotation, and for such purposes, the closed or blind flange may be employed for sealing the aperture at one side of the frame member 26.

In the modified form shown in Fig. 13, the cup 10x can be formed as in Figs. 1 to 3. The inner race 15 can be formed as shown in Figs. 5 and 6, and the antifriction roller 20 can be formed as shown in Fig. 7. In this form of construction, however, it is usually preferred to eliminate the step of case-hardening the cup 10 as it does not provide tracking surfaces which must resist wear. Instead, three separate hardened members are introduced to provide the wear-surfaces of the outer race which then is comprised of the cup 10x, a first washer 12x resting against the flange 12, a cylindrical sleeve 10y closely fitting within the cup 10x and resting against the washer 12x, and a second washer 11x resting against the other end of a sleeve 10y, which thus provides a shoulder in the outer race for receiving this washer 11x. In assembly of the structure of Fig. 13, the washer 12x and the sleeve 10y are introduced into the cup 10x, and then the inner race and antifriction rollers 20 are assembled in position. The washer 11x is inserted, and finally the lip 11m is bent over, preferably by punch-and-die shaping operations and is caused to bear against the washer 11x, so that the assembly of the outer race has inwardly directed flange portions formed by the washers 11x, 12x which are presented for engagement by the inner race 15 to prevent axial separating movements of the races and rollers, and the parts are held permanently in position by the flanges 12, 11m provided at the ends of the cup 10x.

The above method is preferred for employment when the bearings are to be manufactured in large quantity, since automatic machinery and simple manufacturing operations can be employed therein; the dimensions of the formed cups may be held at very close tolerances since they are repetitively manufactured from sheet metal by punching and shaping operations, and the dimensions of the inner races and rollers may similarly be accurately maintained by manufacturing and finishing by centerless grinding operations.

The structures shown in the figures may also be made in other ways, such as by turning and boring bar stock to form the cups when limited quantities of a particular size are to be made. Likewise, the inner races and rollers may be formed by casting or molding to the final or essentially the final condition. Other operations, such as spinning, may be employed for bringing the lips or closing flanges into their final positions.

It is obvious that the invention is not limited solely to the form of construction shown, but that it may be practiced in many ways within the scope of the appended claims.

I claim:

1. The process of making a unit-type anti-friction bearing having an outer race, anti-friction members, and an inner race which consists in progressively forming in successive operations a cup of circular section having at one end an inturned flange which extends inwardly for engagement with the inner race to detain the same against axial separating movement and partially forming at the other end a second flange in the shape of a truncated cone while the metal is in a soft condition and providing in said second flange an opening larger than the outside diameter of the inner race and thereafter hardening said second flange, introducing the anti-friction members and inner race through said opening and positioning them in the cup with the race in engagement with the inturned flange of the cup, and then finally bending said second flange inwardly into engagement with the inner race to detain the same against axial separating movement.

2. A unit-type anti-friction bearing comprising an outer single-piece race consisting of a cup of circular section having at one end an inturned flange and provided at the other end with a second integral inturned flange of less thickness than that of the cup, an inner race having an outer surface of circular section and of axial dimension slightly less than the distance between the flanges, and anti-friction members of an axial dimension slightly less than said distance and positioned in the annular space between the outer and inner races, said second flange having the characteristic of being preformed partially while in a soft condition to a truncated shape and then hardened and finally bent into parallelism with the first flange, said second flange extending radially inwardly beyond said members for engagement with the end of the inner race, whereby to prevent axial separating movement of the outer and inner race members.

DONALD EDWARD LEWIS.